No. 825,839. PATENTED JULY 10, 1906.
H. JAMES.
LOAD INDICATOR.
APPLICATION FILED MAR. 31, 1906.

WITNESSES:

Harry James INVENTOR

By C. A. Snow & Co.
ATTORNEYS

THE NORRIS PETERS CO., WASHINGTON, D. C.

UNITED STATES PATENT OFFICE.

HARRY JAMES, OF RUSH SPRINGS, INDIAN TERRITORY.

LOAD-INDICATOR.

No. 825,839.   Specification of Letters Patent.   Patented July 10, 1906.

Application filed March 31, 1906. Serial No. 309,204.

*To all whom it may concern:*

Be it known that I, HARRY JAMES, a citizen of the United States, residing at Rush Springs, in the county of Chickasaw, Indian Territory, have invented a new and useful Load-Indicator, of which the following is a specification.

This invention relates to attachments to vehicles of various kinds for indicating the load borne thereby, more particularly for attachment to railway-cars and similar vehicles, and has for its object to improve and simplify the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

The improved device may be applied to any of the various makes of cars; but for the purpose of illustration is shown applied to a conventional freight-car truck.

Figure 1:
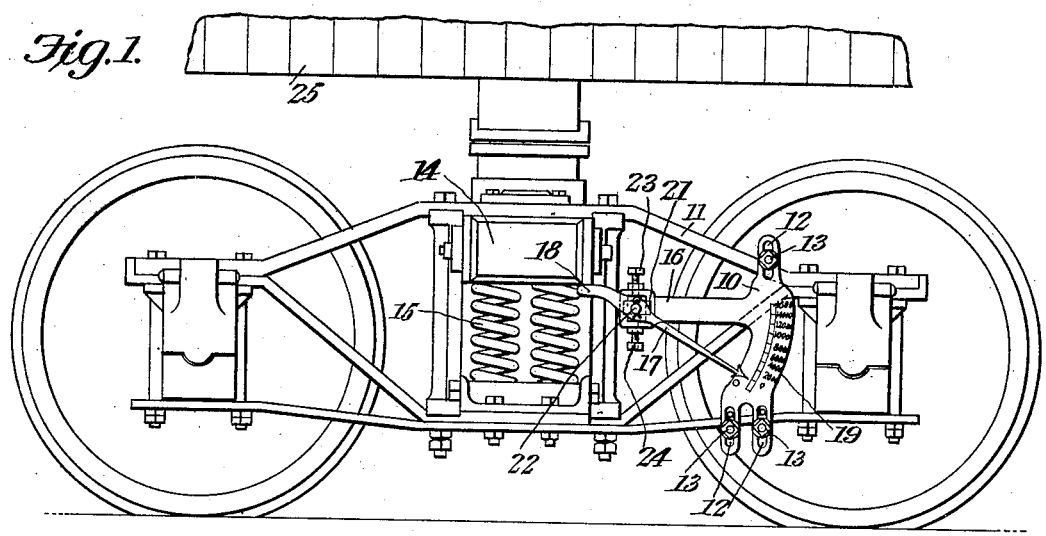
Figure 2:
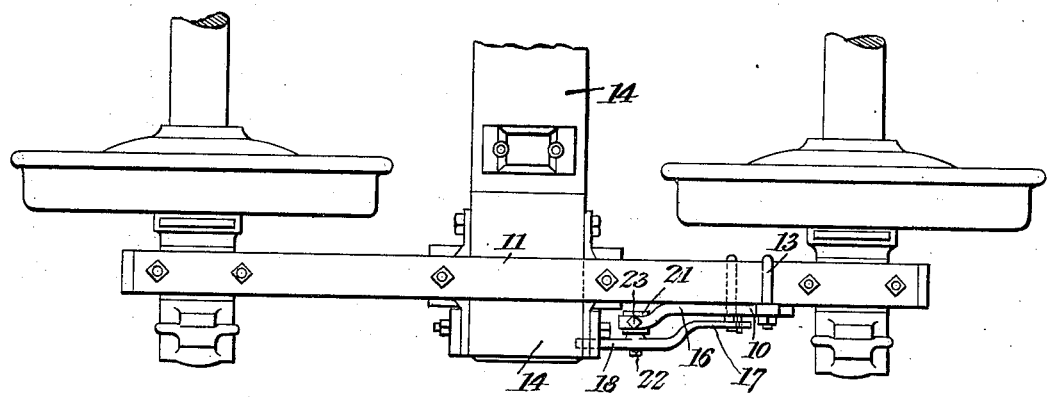
Figure 3:
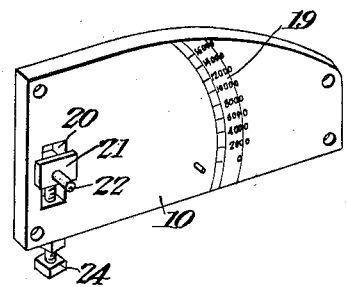
Figure 4:
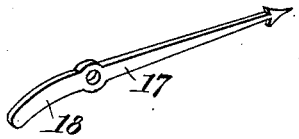

In the drawings, Figure 1 is a side elevation of the truck, and Fig. 2 is a plan view of a portion of the same with the improved indicator device applied thereto. Fig. 3 is a perspective view detached of a modified form of the indicator device. Fig. 4 is a perspective view of the pointer portion of the device detached.

The improved device comprises a plate 10 of suitable form and adapted to be adjustably connected to the running-gear of the vehicle—such, for instance, as the truck-frame 11 of a railway freight-car.

The frame 10 is shown provided with slots 12, through which clamp-bolts 13 operate to enable the frame to be adjustably connected to the truck-frame, the slots providing for attaching the frame to truck-frames of different sizes, as well as to adjust the plate upon the truck-frame. Truck-frames of this class are provided with a bolster member 14, supported upon springs 15, the load or body portion 25 of the car being carried by the bolster and the latter deflected by the load, this deflection being utilized in the present invention to indicate the weight of the load, as hereinafter described.

Extending from the plate 10 is an arm 16, having a pointer 17 swinging from its outer end, the shorter end 18 of the pointer extending into the path of the bolster 14 and the longer end of the pointer movable over a system of graduations 19 on the plate 10.

The pointer 17 is adjustably connected to the arm 16, so that it may be set with the free end of the pointer at "0" or at some other predetermined point on the plate when the car is "light" or when no load is disposed thereon. Then as the load is placed upon the car the deflection of the bolster will cause the movement of the pointer over the graduations, and thus indicate the extent of the deflection, and consequently the amount of the load, it being understood that the parts will be so proportioned that the weight of the load will be indicated by the pointer upon the graduations.

The free end of the arm 16 is constructed with a vertical guide-slot 20, in which a block 21 is slidably disposed, the block having a stud 22, upon which the pointer swings. The block is adjustable in the slots by screws 23 24. By this simple means the pointer may be accurately adjusted relative to the bolster and the graduations, so that the amount of the load may be indicated with corresponding accuracy.

The form of the frame 10 may be varied to adapt it to the different forms of trucks manufactured. In Figs. 1 and 2 the plate 10 is arranged for attachment to the ordinary open-frame-standard freight-car truck, and in Fig. 3 a modified form of the plate is shown, which may be required for attachment to other forms of truck-frames, and I do not wish to be limited therefore in any manner to the shape of the frame, as the same may be varied to suit different forms of truck-frame without departing from the principle of the invention or sacrificing any of its advantages, as will be obvious. One of the attachments will be applied at each end of each truck-frame and the average deflection will indicate the load of the car.

Having thus described the invention, what is claimed as new is—

1. A device of the class described comprising a member having spaced graduations and with means for attachment to the running-gear of a vehicle and provided with a laterally-extending arm, a stud connected adjustably to said arm, a pointer swinging upon said stud with one end extending into the path of a moving part of a body portion of a vehicle and the other end movable over said graduations.

2. The combination with a car-truck including the frame and a spring-supported bolster, of a plate having means for detachably coupling the same to said frame, said plate having spaced graduations and an arm extending laterally thereform, a pointer swinging from said arm and extended at one end into the path of said bolster and with the other end movable over said graduations, and means for adjusting said pointer relative to said arm.

3. The combination with a car-truck including the frame and a spring-supported bolster, of a plate having means for detachably coupling the same to said frame, said plate having spaced graduations, a stud connected adjustably to said plate, a pointer swinging upon said stud with one end extending into the path of said bolster and the other end movable over said graduations.

4. The combination with a vehicle including the running-gear and the body portion supported by springs upon the running-gear, of a member having means for adjustable connection to the running-gear and provided with spaced graduations, a stud adjustably connected to said member, a pointer swinging upon said stud with one end movable over said graduations and the other end extended into the path of the body portion of the vehicle.

In testimony that I claim the foregoing as my own I have hereto affixed my signature in the presence of two witnesses.

HARRY JAMES.

Witnesses:
T. L. WADE,
WILL DARNALL.